United States Patent [19]

Yamakawa

[11] Patent Number: 5,313,598
[45] Date of Patent: May 17, 1994

[54] METHOD FOR CHANGING NON-LEAF ENTRY IN TREE STRUCTURE OF OSI DIRECTORY INFORMATION BY SEQUENTIALLY ISSUING OSI DIRECTORY COMMANDS FOR THE NON-LEAF ENTRY AND LOWER ENTRIES ASSOCIATED THEREWITH IN RESPONSE TO DECODED CHANGE COMMAND

[75] Inventor: Keiko Yamakawa, Yokohama, Japan

[73] Assignee: Hitachi, Ltd., Tokyo, Japan

[21] Appl. No.: 627,866

[22] Filed: Dec. 17, 1990

[30] Foreign Application Priority Data

Dec. 19, 1989 [JP] Japan ................... 1-327315

[51] Int. Cl.⁵ .................... G06F 9/22; G06F 12/00
[52] U.S. Cl. .................... 395/375; 364/251.6;
364/266; 364/267; 364/269.4; 364/282.1;
364/282.3; 364/283.2; 364/283.3; 364/283.4;
364/DIG. 1
[58] Field of Search .................... 395/700, 600, 375

[56] References Cited

U.S. PATENT DOCUMENTS

| | | | |
|---|---|---|---|
| 4,439,828 | 3/1984 | Martin | 395/375 |
| 4,805,134 | 2/1989 | Calo et al. | 395/600 |
| 4,825,363 | 4/1989 | Baumann et al. | 395/375 |
| 4,987,492 | 1/1991 | Stults et al. | 358/181 |
| 5,086,504 | 2/1992 | Nemeth-Johannes et al. | 395/700 |

OTHER PUBLICATIONS

The Directory-Abstract Service Definition Dec. 1988.
The Directory-Overview of Concepts, Model and Services. Dec. 1988.

*Primary Examiner*—Alyssa H. Bowler
*Assistant Examiner*—Meng-Ai T. An
*Attorney, Agent, or Firm*—Antonelli, Terry, Stout & Kraus

[57] ABSTRACT

A method for changing an OSI (Open Systems Interconnection) directory information including a plurality of entries of a tree structure includes the steps of decoding a change command for changing a portion of the directory information including a non-leaf entry and at least one lower entry associated with the non-leaf entry, sequentially issuing, in response to the decoded change command, OSI directory commands for the non-leaf entry and the at least one lower entry, the issued OSI directory commands being determined based on the decoded change command, and executing the issued OSI directory commands to change the tree structure of the directory information.

8 Claims, 7 Drawing Sheets

METHOD FOR CHANGING NON-LEAF ENTRY IN TREE STRUCTURE OF OSI DIRECTORY INFORMATION BY SEQUENTIALLY ISSUING OSI DIRECTORY COMMANDS FOR THE NON-LEAF ENTRY AND LOWER ENTRIES ASSOCIATED THEREWITH IN RESPONSE TO DECODED CHANGE COMMAND

BACKGROUND OF THE INVENTION

1. Field of the Invention

The present invention relates to a system for modifying non-leaf entries in an OSI (Open System Interconnection) directory of a tree structure, and more particularly to a directory service system using an OSI directory in which entries can be added, modified or removed to or from a directory information tree (DIT).

2. Description of the Related Art

Generally, in order to make it possible to communicate with a destination terminal without knowing a physical arrangement of a network, in an OSI directory, address information and attribute information of the destination terminal are provided on the basis of a logical name thereof, to be informed to a source terminal.

A system for implementing such a directory service as mentioned above usually comprises a directory user agent (DUA), a directory service agent (DSA) and a directory information base (DIB). Entities to be managed by the OSI directory are called objects which are stored as entries in the DIB. A structure in which these entries are arranged in a tree form, based on correlation of the entries with each other, is called a directory information tree (DIT). The highest entry of this DIT is called a root which is connected with lower entries. Of these lower entries, entries which are not connected with further lower entries are called leaf entries, and entries which are not the leaf entries are called non-leaf entries.

The commands which can be used in the above system including the DUA and DSA, include LIST, READ, ADD, MODIFY RDN, and so on. These commands, however, operate only for leaf entries so that the system has a drawback that non-leaf entries cannot be modified through the commands. For example, in a case where a certain section is shifted into another section or a name of the section is changed, because of the change in organization without changing constituent elements of the section, the inherent name of the section as a non-leaf entry must be modified. In this case, the prior art, however, cannot modify the inherent name by a single operation or command.

Prior art related to the OSI directory is described in "OSI—The Directory (ISO9594)" proposed as a Draft International Standard (DIS), and a conventional technique related to a system based on this DIS is disclosed in "Implementation of DIRECTORY (DSA)", JOHOSHORI GAKKAI 38-th 5H-1/2/3. However, this technique is mainly related to the directory (DSA).

Prior art for improving operationality for a directory user is disclosed in, for example, "Proposal of Function for Supporting Directory User", JOHOSHORI GAKKAI 35-th 5U-1. This prior art, however, relates to a search for directories and does not take into consideration improvement of service for users such as addition, modification, etc., of entries for a DIT.

SUMMARY OF THE INVENTION

An object of the present invention is to solve problems of the above prior art in a directory service system and to provide an OSI directory service system which can execute a request for modifying a non-leaf entry in a directory tree structure through one operation.

In accordance with the present invention, in order to attain the above object, when the directory service system receives the request with old and new inherent names for modifying an inherent name of the non-leaf entry, the standard commands are issued to the DSA and the DUA so as to perform a standard operation for the DIB and the inherent name of the non-leaf entry is modified. More specifically, the LIST commands are issued to obtain the DIT structure information of a designated entry having an old inherent name and all its lower entries, the READ commands are issued to obtain all attribute information of the designated entry and all the lower entries, the REMOVE Entry commands are issued to remove the designated entry and all the entries from the DIT structure, and the ADD Entry commands are issued to add the designated entry having the new inherent name and all the lower entries to the DIT structure, thus completing the modification of the inherent name of the designated non-leaf entry.

The directory service system according to the present invention comprises sufficient memory to store information of each of the non-leaf entries. When the directory service system receives the old and new inherent name of the designated non-leaf entry from a directory user, the old inherent name of the designated non-leaf entry is modified to the new inherent name on the basis of standard service (operations by the commands of LIST, READ, REMOVE Entry and ADD Entry) provided by the OSI directory, all entries lower than the designated entry are added to the DIT structure as the lower entries of the non-leaf entry with the new inherent name, and completion of the DIT structure modification process is informed to the user.

In this way, the directory user has only to issue one command to modify the inherent name of a designated non-leaf entry and shift all the lower entries of the designated non-leaf entry to the lower side of the non-leaf entry with the new name.

DESCRIPTION OF THE PREFERRED EMBODIMENTS

Now, referring to the accompanying drawings, explanation will be given for a directory service system for an OSI directory structure according to the present invention.

Figure 1:
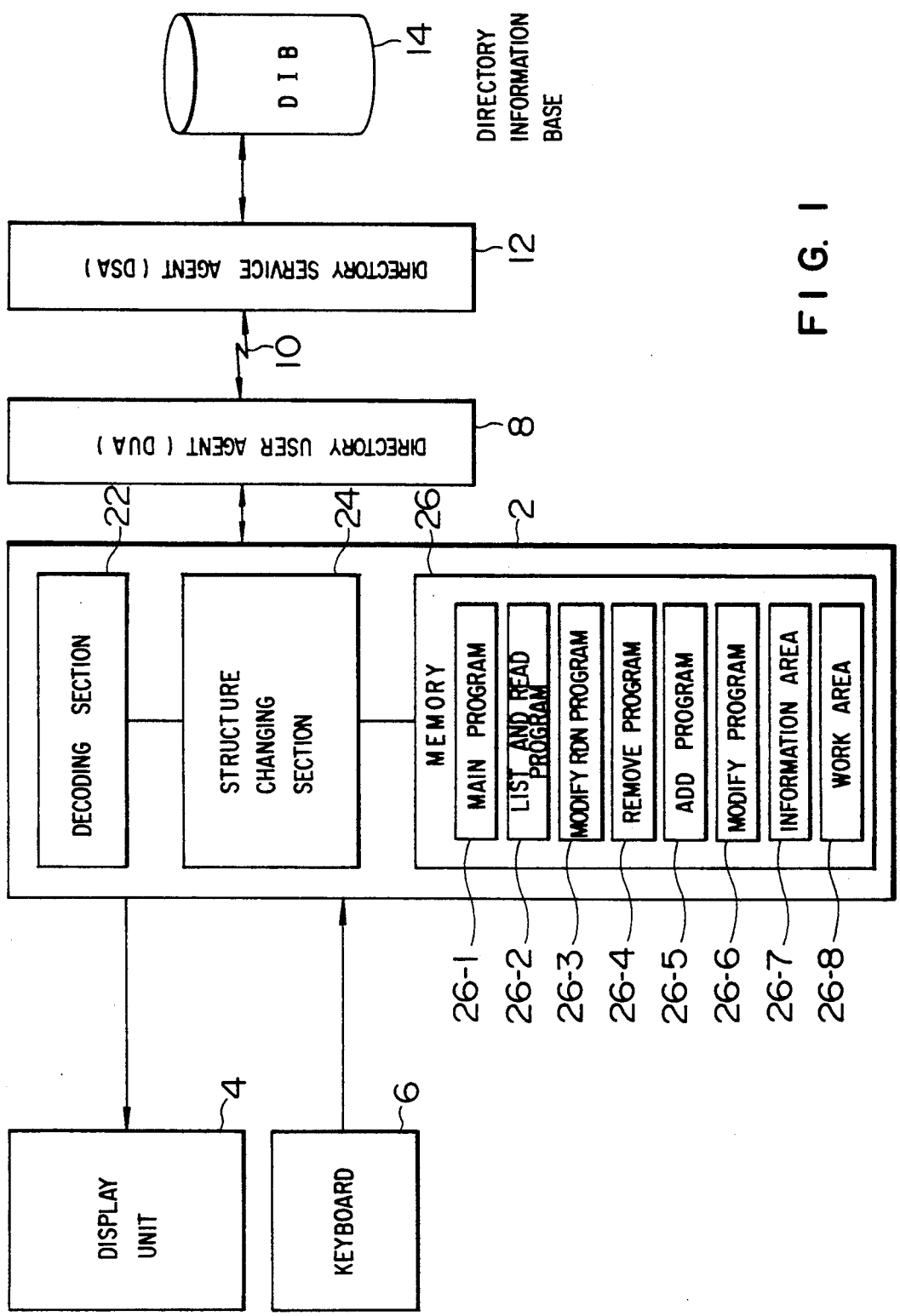
FIG. 1 is a block diagram showing arrangement of a directory service system according to a first embodiment of the present invention.
Figure 2:
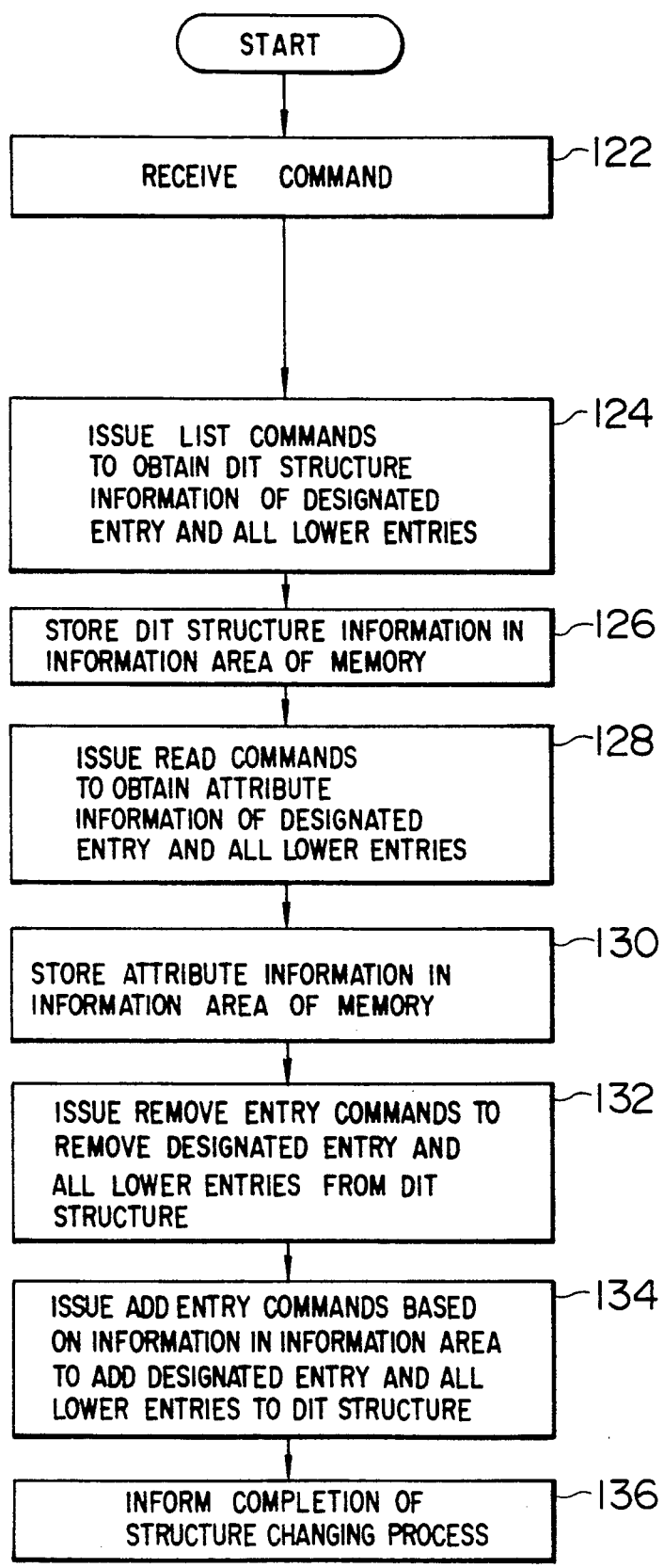
FIG. 2 is a flowchart for explaining an operation of the first embodiment.
Figure 3:
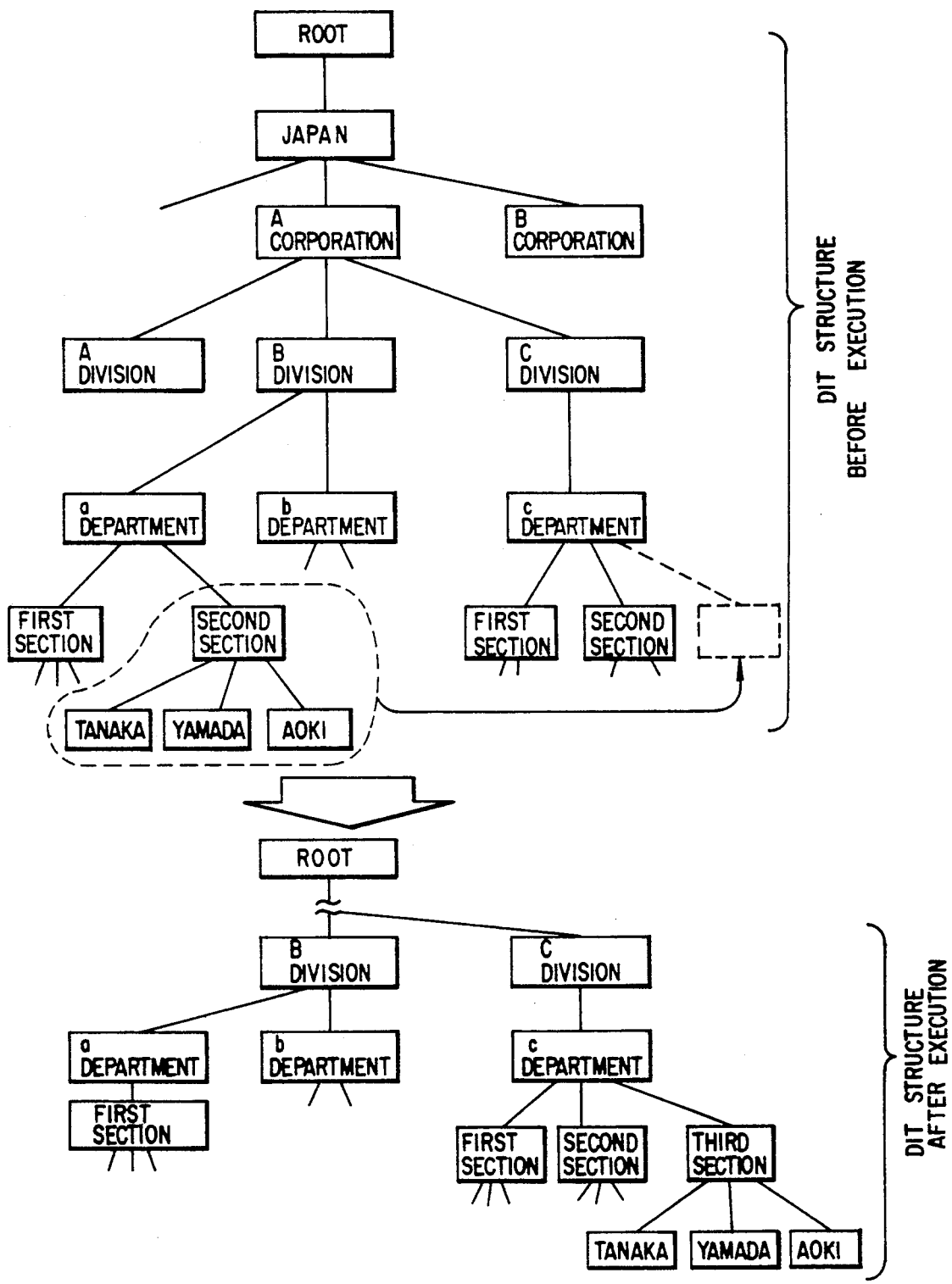
FIG. 3 is a view for explaining modification of a DIT structure.

FIG. 1 is a block diagram showing an arrangement of a first embodiment of the directory service system according to the present invention. FIG. 2 is a flowchart for explaining an operation of the first embodiment. FIG. 3 is a view for explaining modification of a Directory Information Tree (DIT) structure.

In FIG. 1, an interface unit 2 is a characteristic portion of the present invention. A display unit 4 displays output data from the interface unit 2. When commands are input from an input device 6 such as a keyboard to interface unit 2, the interface unit 2 outputs a train of commands. A Directory User Agent (DUA) 8 is a standard user interface for utilizing a OSI directory service. The command train from the interface unit 2 is sent to the DUA 8. A Directory Information Base (DIB) stores directory information in the form of a tree structure. A Directory Service Agent (DSA) 12 receives a command from the DUA 8 through a communication network 10 to execute for the DIB 14 an operation determined in accordance with the command, and returns the executing result to the interface unit 2 through the network 10 and DUA 8. The display unit 4 displays the result sent from the interface unit 2.

Interface unit 2 includes a decoding section 22, a structure changing section 24 and a memory 26. The section 22 decodes a command input from the keyboard 6. When the input command is one of predetermined commands, i.e., the standard commands for the OSI directory, the section 22 outputs the input commands to the DUA 8. When the input command is not one of the predetermined commands, the section 22 activates the structure changing section 24 to execute a structure changing processing. The memory 26 stores data and programs necessary for the structure changing processing. Specifically, the memory 26 stores, in addition to a main program 26-1 for controlling the DIT structure changing processing through one command, a LIST and READ program 26-2, a MODIFY RDN program 26-3, a REMOVE program 26-4, an ADD program 26-5 and a MODIFY program 26-6. Memory 26 further comprises an information area 26-7 for storing information read out from the DIB 14 and information input from the keyboard 6, and a work area 26-8 used for the structure changing processing.

Explanation will be made of the standard directory service operations through DUA 8 and DSA 12.

Figure 4:
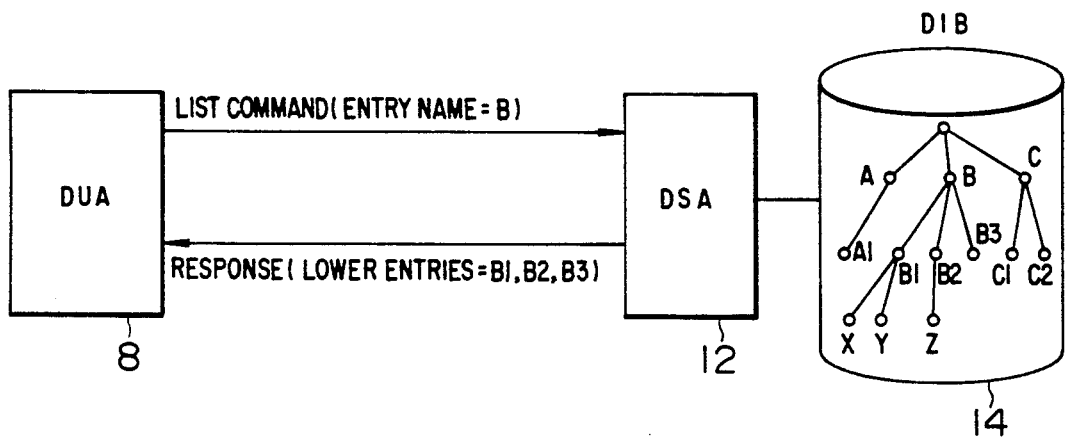
FIGS. 4, 5 and 6 are views for explaining a LIST operation a READ operation and an ADD operation which are standard operations, respectively.
Figure 5:
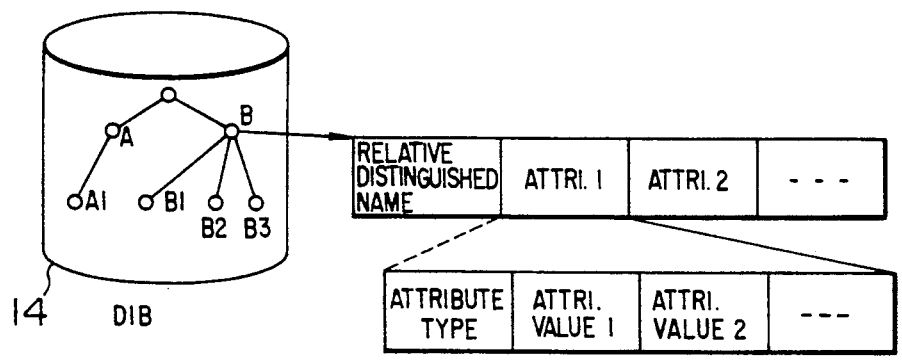
Figure 6:
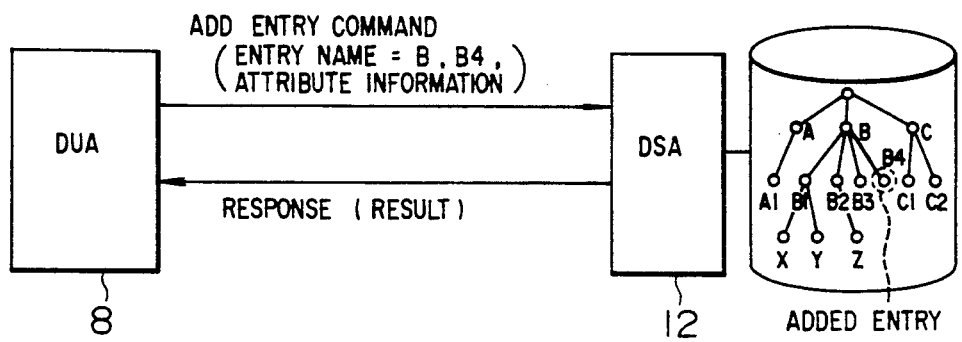

FIGS. 4, 5 and 6 are views for explaining the LIST operation, the READ operation and the ADD operation which are the standard service operations. As seen from these figures, the directory includes entry names and the tree structure information indicative of correlation among entries and the directory is stored in the DIB 14. Several operations for commands issued from a directory user are executed using the DIB 14.

(1) LIST operation

In this LIST operation, all names of entries directly lower than a designated entry are returned to DUA 8. When it is desired to know names of lower entries of an entry B, as shown in FIG. 4, a LIST command (entry name =B) is issued from the DUA 8 to the DSA 12. The LIST command is supplied to the DSA 12 through the DUA 8. In response to this LIST command, the DSA 12 searches the DIB 14 to thereby know that names of entries directly lower than the entry B are B1, B2 and B3. These entry names are responded to the DUA 8. Likewise, when the LIST command is issued to the DSA 12 through the DUA 8 for each of the entries B1, B2 and B3, entry names X and Y are responded for the entry B1 and an entry name Z is responded for the entry B2. However, since the lead entry B3 has no directly lower entry, "No entry" is responded for the LIST command. By executing the LIST operation until all the leaf entries are responded, the directory user can know a structure portion of the directory information tree (DIT) structure.

(2) READ operation

In this operation, information of a designated entry such as an attribute type, an attribute value, and the like is read out. The directory user issues a READ command to the DSA 12 through the DUA 8. In response to this command, information possessed by the designated entry can be known. The entire or part of the information can be obtained in accordance with a parameter of the command. As seen from FIG. 5, the information of each entry is composed of a relative distinguished name for distinguishing the designated entry from other entries and its attribute data which includes an attribute type and attribute values.

(3) ADD Entry operation

In this operation, an entry is added at a lower portion than a designated leaf entry in the tree structure. The directory user sets the name of an entry to be added and also its attribute information (which is occasionally not included) in a parameter to issue an ADD entry command to the DSA 12 through the DUA 8. In the example of FIG. 6, an entry name B.B4 and its attribute information are set in the parameter. The entry name B.B4 means an entry B4 which is lower than the entry B and has the relative distinguished name B4. In response to the ADD Entry command, the DSA 12 searches the DIB 14 to check whether or not the entry B.B4 is already present in the DIT structure stored in the DIB 14. If the entry B.B4 is not present there, this entry is added at a designated position of the DIT structure. If the entry B.B4 is already present, a response of error is sent to the DUA 8.

In addition to the above standard service commands, operations for a REMOVE Entry command for removing a designated entry, a MODIFY command for modifying attribute information, a MODIFY RDN command for modifying the inherent name of a designated entry, and the like can be provided. It should be noted that the REMOVE command and the MODIFY RDN command of these commands can be issued only for leaf entries.

Referring to FIG. 2, an operation of the first embodiment of the present invention will be explained in connection with processing for modifying the inherent name of a non-leaf entry.

Now it is assumed that a directory user intends to modify the inherent name of an object entry of a DIT structure stored in the DIB 14. In this case, generally, the user does not know whether the object entry is a non-leaf entry or a leaf entry. Hence, first, the user issues a standard command for modifying the name of the object entry, MODIFY RDN to the decoding section 22 from the keyboard 6. The decoding section 22, when the issued command is one of predetermined standard commands, outputs that command to the DUA 8. In response to this command, the DUA 8 requests, through network 10, the DSA 12 to execute the command.

The DSA 12 examines the storage contents of the DIB 14 to check if the entry designated by the command is a leaf entry or not. If the designated entry is a leaf entry, its name will be modified. If the designated entry is a non-leaf entry, on the basis of the response from the DSA 12, the DUA 8 transfers, to the display unit 4 through the interface unit 2, a response that the name of the designated entry, which is a non-leaf entry, cannot be modified.

If, regardless of this response, the directory user still desires to modify the name of the designated non-leaf entry, the user issues to the decoding section 22 a name modification command with an old inherent name and a new inherent name as a parameter. The decoding section 22 decodes this command to activate the structure changing section 24. In accordance with main program 26-1 and programs 26-2 to 26-6 for issuing predetermined directory standard commands, the section 24 executes the structure changing processing. e.g. the name modification processing in this embodiment. In this case, the information area 26-7 in the memory 26 is used to temporarily store information of the designated entry and of its lower entries. The DUA 8 receives commands from the section 24 and requests the DSA 12 to execute these commands.

The structure changing section 24 receives a command for modifying the name of a designated non-leaf entry and performs operations in accordance with the flowchart of FIG. 2 to modify the name of the designated non-leaf entry. The flowchart will be explained below.

In step 122, the decoding section 22 receives, from a directory user, a name modification command with as a parameter a current inherent name as an old inherent name and a new inherent name. The old inherent name of the object entry is "Japan—A corporation—B division—a department—second section". The "second section" is a relative distinguished name of the object entry. The new inherent name has the same form with the relative distinguished name of "third section".

In step 124 the section 24 is activated in accordance with the program 26-1. In order to acquire all the entries for which modification should be made, the section 24 executes the program 26-2. As a result, a LIST command is repeatedly issued to the DUA 8 to obtain all the entries directly lower than a designated non-leaf entry, the entries directly lower than each of the lower entries thus obtained, and so on. Thus, the DIT structure information of the designated entry and all its lower entries can be obtained.

Figure 7:
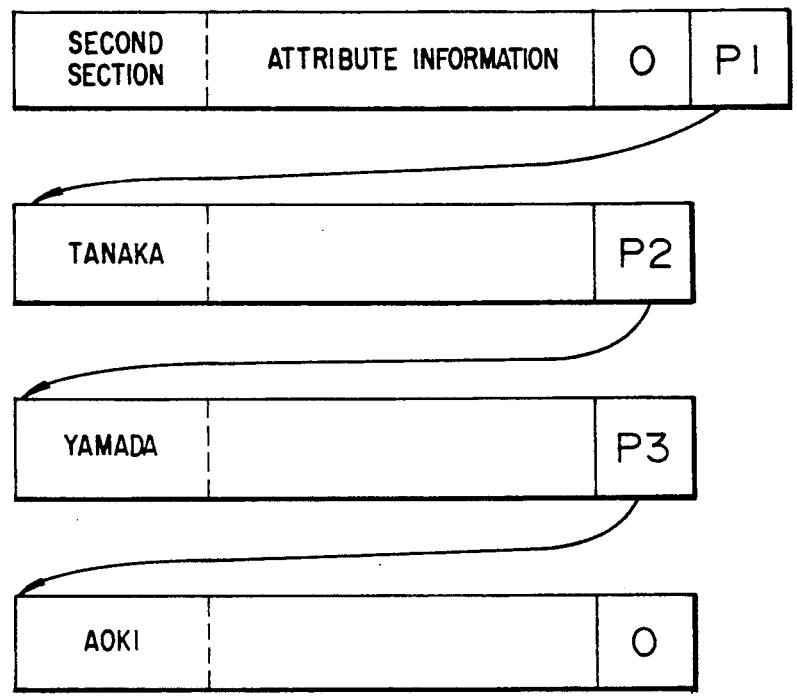
FIG. 7 is a view for explaining data stored in an information area of a work area in a memory.
Figure 7:
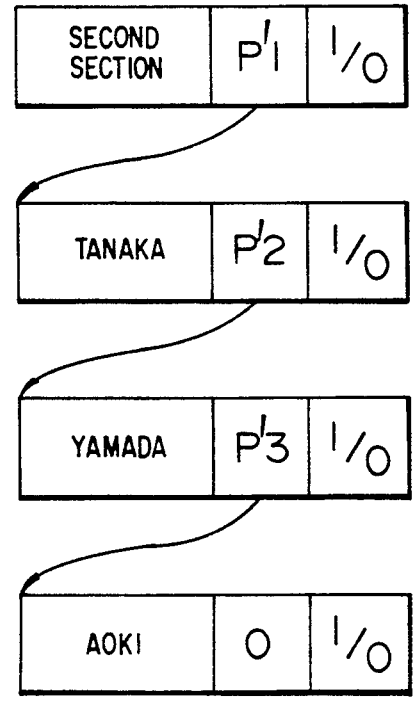

In step 126, the DIT structure information is stored in the information area 26-7 of the memory 26 as shown in FIG. 7, but attribute information is not stored yet.

In step 128, READ commands are issued to the DUA 8 on the basis of the program 26-2 to obtain the attribute information. Then, a data link as shown in FIG. 7 is created in the work area 26-8 in accordance with the structure information stored in the information area 26-7. Each data in the data link includes a pointer and a flag. Each flag is set to "1" when the data link is created and it is reset to "0" whenever the READ command for the entry is issued. Respective READ commands are executed to obtain the attribute information of the designated entry and its all lower entries.

In step 130, the attribute information thus obtained is stored in the information area 26-7 of the memory 26 as shown in FIG. 7.

In step 132, after all the flags are set again, the REMOVE Entry commands are sequentially issued to the DUA 8 in accordance with a data link reverse to the data link as described above on the basis of the program 26-5. In response to each REMOVE Entry command received through the network 10, the DSA 12 sequentially removes the designated entry, "second section", and all its lower entries, "Tanaka, Yamada and Aoki", from the DIT structure in the DIB 14.

In step 134, after all the flags are set again in accordance with the decoded command, the ADD Entry commands are sequentially issued to the DUA 8 in accordance with the data link, the DIT structure information and the attribute information of each entry on the basis of the program 26-5. Then, an entry with the new inherent name containing a relative distinguished name "third section" is added. Further, the entries lower than the object entry with the old inherent name are added at a lower portion than the added entry with new inherent names. In this way, the entry with the new inherent name and all its lower entries are added to the DIT structure.

In step 136, the structure changing process is ended, and completion thereof is informed to the directory user through the display unit 4.

According to this embodiment of the present invention, in order to modify the name of a non-leaf entry, only one command has been executed to change the object entry and all the lower entries with the old inherent names into those with the new inherent names.

The manner of modifying the entry name as described above is shown in FIG. 3 in terms of the DIT structures before and after execution of the modification. The example of FIG. 3 shows that the entry with the name of "A corporation—B division—a department—second section" is shifted to the position of the entry with the name of "A corporation—C division—c department—third section", and the lower entries in the former directory tree structure such as Tanaka, Yamada and Aoki who are members of the section are also shifted to corresponding positions in the latter directory tree structure.

Incidentally, although in this embodiment, the standard service commands for modifying an inherent name of a non-leaf entry were used in the order of LIST, READ, REMOVE Entry and ADD Entry, it is apparent that the order of REMOVE Entry and ADD Entry may be reversed.

Further, the removal of a non-leaf entry can be attained through the LIST operations and the REMOVE Entry operations, and the addition of a non-leaf entry can be attained through the LIST operations, the READ operations and the ADD Entry operation.

Figure 8:
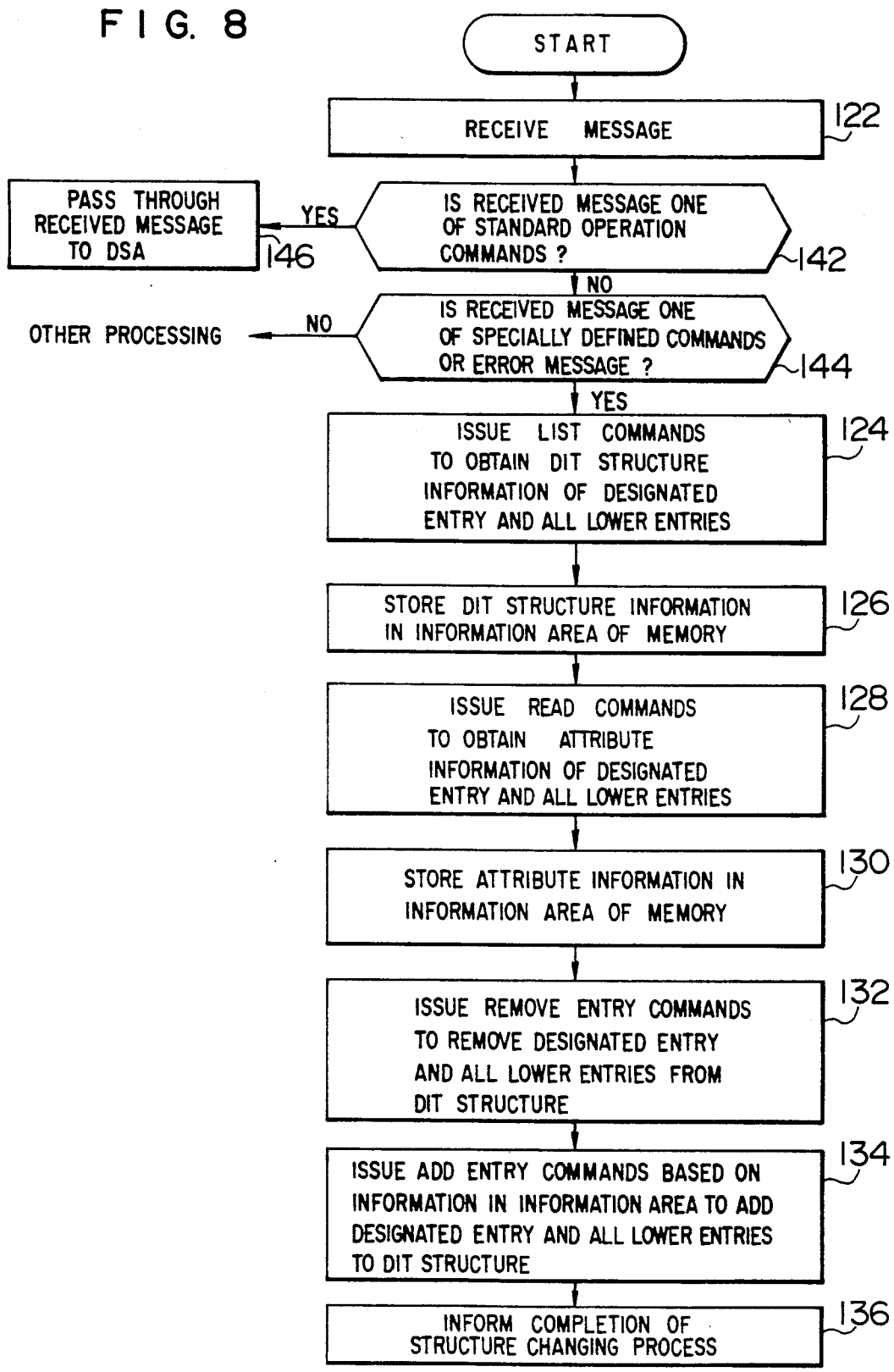
FIG. 8 is a flowchart for explaining an operation of a second embodiment of the present invention.

Now referring to the flowchart of FIG. 8 and FIG. 1, a second embodiment of the present invention will be explained only in its differences from the first embodiment.

In step 122, a message input from the keyboard 6 is received by the decoding section 22.

In step 142, the decoding section 22 decides if the received message is one of predetermined standard operation commands.

If the answer in step 142 is 'Yes', in step 146, the message is passed to the DSA 12 through the DUA 8 and the network 10. If the answer in step 142 is 'No', in step 144, the decoding section 22 decides if the received message is one of specially defined commands or an error message for the command sent to the DSA 12 in the step 122.

Figure 9:
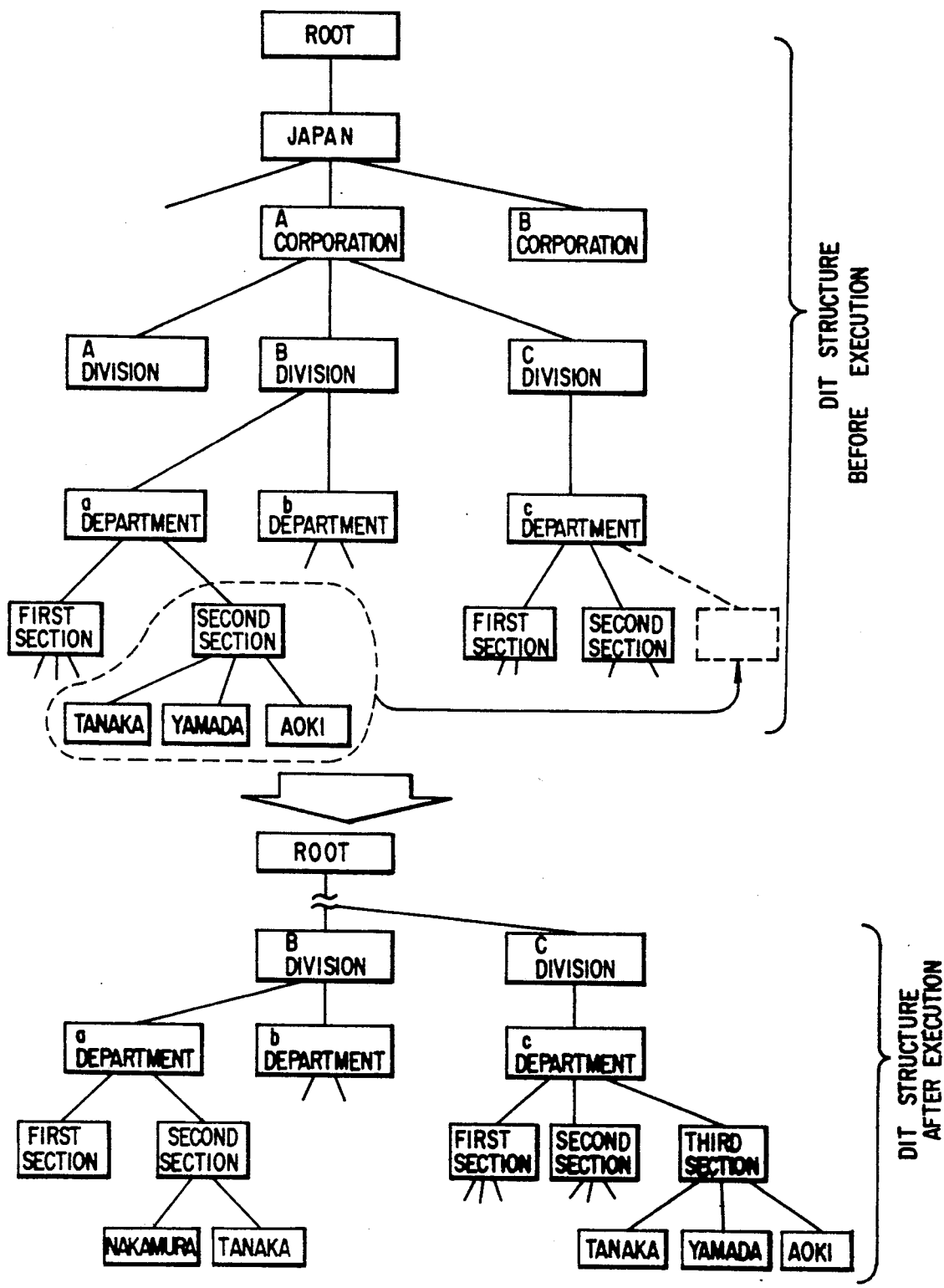
FIG. 9 is a view for explaining modification of the DIT structure in the second embodiment.

If the answer in step 144 is 'Yes', the operations of step 124 et seq. are executed as in the same manner as in the first embodiment. FIG. 9 shows the DIT structures before and after execution of the modification.

As described above, in accordance with the present invention, a command for changing the directory structure only has to be issued once to shift a non-leaf entry and all its lower entries to other positions with new inherent names.

I claim:

1. A method for changing an OSI (Open Systems Interconnection) directory information including a plurality of entries of a tree structure, the method being performed by an apparatus and comprising the steps of:
   (a) decoding a command;
   (b) if the decoded command is any one of a plurality of OSI directory commands, performing the substeps of
      (b1) transmitting the decoded command to a DSA (directory service agent),
      (b2) generating, in the DSA, an error message in response to the decoded command if the decoded command is a command which can only be executed for a leaf entry but designates a non-leaf entry having associated therewith at least one lower entry, or if the decoded command is a command for adding an entry but designates an entry that already exists, and
      (b3) if an error message is not generated in the DSA in response to the decoded command, executing, in the DSA, the decoded command;
   (c) if the decoded command is not any one of a plurality of OSI directory commands but is a change command for changing a portion of the directory information including a non-leaf entry at least one lower entry associated with the non-leaf entry, or if an error message is generated in the DSA in response to the decoded command and the decoded command is a command which can only be executed for a leaf entry but designates a non-leaf entry having associated therewith at least one lower entry, performing the substeps of
      (c1) sequentially issuing to the DSA, in response to the decoded command, OSI directory commands for the non-leaf entry and the at least one lower entry, the issued OSI directory commands being determined based on the decoded command, and
      (c2) executing, in the DSA, the issued OSI directory commands to change the tree structure of the directory information.

2. A method according to claim 1, wherein the decoded command is the change command;
   wherein the change command is a command for moving the directory information portion and specifies the non-leaf entry and a new non-leaf entry of which the directory information portion is to be connected; and
   wherein the subset (c1) includes the substeps of:
      (c11) sequentially issuing LIST commands in response to the change command to identify the non-leaf entry and the at least one lower entry;
      (c12) sequentially issuing READ commands based on the identified non-leaf entry and the identified at least one lower entry to obtain respective relative names in the directory information of the identified non-leaf entry and the identified at least one lower entry and respective attribute information thereof;
      (c13) sequentially issuing REMOVE Entry commands based on the identified non-leaf entry and the identified at least one lower entry to remove the identified non-leaf entry and the identified at least one lower entry from the directory information;
      (c14) changing the obtained relative names based on the new non-leaf entry; and
      (c15) sequentially issuing ADD Entry commands based on the changed relative names to connect the identified non-leaf entry and the identified at least one lower entry to the new non-leaf entry.

3. A method according to claim 1, wherein the decoded command is the change command;
   wherein the change command is a command for removing the non-leaf entry and the at least one lower entry from the directory information; and
   wherein the substep (c1) includes the substeps of:
      (c11) sequentially issuing LIST commands in response to the change command to identify the non-leaf entry and the at least one lower entry; and
      (c12) sequentially issuing REMOVE Entry commands based on the identified non-leaf entry and the identified at least one lower entry to remove the identified non-leaf entry and the identified at least one lower entry from the directory information.

4. A method according to claim 1, wherein the decoded command is the change command;
   wherein the change command is a command for inserting a new non-leaf entry with a new relative name and new attribute information into the directory information, the new non-leaf entry to be connected to a designated non-leaf entry to which the directory information portion including the non-leaf entry and the at least one lower entry is connected; and
   wherein the substep (c1) includes the substeps of:
      (c11) sequentially issuing LIST commands in response to the change command to identify the non-leaf entry and the at least one lower entry;
      (c12) sequentially issuing READ commands based on the identified non-leaf entry and the identified at least one lower entry to obtain respective relative names in the directory information of the identified non-leaf entry and the identified at least one lower entry and respective attribute information thereof;
      (c13) sequentially issuing REMOVE Entry commands based on the identified non-leaf entry and the identified at least one lower entry to remove the identified non-leaf entry and the identified at least one lower entry from the directory information;
      (c14) issuing an ADD Entry command for the new non-leaf entry to connect the new non-leaf entry to the designated non-leaf entry;
      (c15) changing the obtained relative names based on the new relative name; and
      (c16) sequentially issuing ADD Entry commands based on the changed relative names to connect the identified non-leaf entry and the identified at least one lower entry to the new non-leaf entry.

5. A directory service system for changing an OSI (Open Systems Interconnection) directory information including a plurality of entries of a tree structure, the directory service system comprising:

means for decoding a command;

means for transmitting the decoded command to a DSA (directory service agent) if the decoded command is any one of a plurality of OSI directory commands, wherein the DSA generates an error message in response to the decoded command if the decoded command is a command which can only be executed for a leaf entry but designates a non-leaf entry having associated therewith at least one lower entry, or if the decoded command is a command for adding an entry but designates an entry that already exists, and wherein, if the DSA does not generate an error message in response to the decoded command, the DSA executes the decoded command; and command issuing means for sequentially issuing to the DSA, in response to the decoded command, OSI directory commands for the non-leaf entry and the at least one lower entry, the issued OSI directory commands being determined based on the decoded command, if the decoded command is not any one of a plurality of OSI directory commands but is a change command for changing a portion of the directory information including a non-leaf entry and at least one lower entry associated with the non-leaf entry or if the DSA generates an error message in response to the decoded command and the decoded command is a command which can only be executed for a leaf entry but designates a non-leaf entry having associated therewith at least one lower entry, wherein the DSA executes the issued OSI directory commands to change the tree structure of the directory information.

6. A directory service system according to claim 5, wherein the decoded command is the change command;

wherein the change command is a command for moving the directory information portion and specifies the non-leaf entry and a new non-leaf entry to which the directory information portion is to be connected; and wherein the command issuing means includes:

means for sequentially issuing LIST commands in response to the change command to identify the non-leaf entry and the at least one lower entry;

means for sequentially issuing READ commands based on the identified non-leaf entry and the identified at least one lower entry to obtain respective relative names in the directory information of the identified non-leaf entry and the identified at least one lower entry and respective attribute information thereof;

means for sequentially issuing REMOVE Entry commands based on the identified non-leaf entry and the identified at least one lower entry to remove the identified non-leaf entry and the identified at least one lower entry from the directory information;

means for changing the obtained relative names based on the new non-leaf entry; and means for sequentially issuing ADD Entry commands based on the changed relative names to connect the identified non-leaf entry and the identified at least one lower entry to the new non-leaf entry.

7. A directory service system according to claim 5, wherein the decoded command is the changed command;

wherein the change command is a command for removing the non-leaf entry and the at least one lower entry from the directory information; and wherein the command issuing means includes:

means for sequentially issuing LIST commands in response to the change command to identify the non-leaf entry and the at least one lower entry; and means for sequentially issuing REMOVE Entry commands based on the identified non-leaf entry and the identified at least one lower entry to remove the identified non-leaf entry and the identified at least one lower entry from the directory information.

8. A directory service system according to claim 5, wherein the decoded command is the change command;

wherein the change command is a command for inserting a new non-leaf entry with a new relative name and new attribute information into the directory information, the new non-leaf entry to be connected to a designated non-leaf entry to which the directory information portion including the non-leaf entry and the at least one lower entry is connected; and wherein the command issuing means includes:

means for sequentially issuing LIST commands in response to the change command to identify the non-leaf entry and the at least one lower entry;

means for sequentially issuing READ commands based on the identified non-leaf entry and the identified at least one lower entry to obtain respective relative names in the directory information of the identified non-leaf entry and the identified at least one lower entry and respective attribute information thereof;

means for sequentially issuing REMOVE Entry commands based on the identified non-leaf entry and the identified at least one lower entry to remove the identified non-leaf entry and the identified at least one lower entry from the directory information;

means for issuing an ADD Entry command for the new non-leaf entry to connect the new non-leaf entry to the designated non-leaf entry;

means for changing the obtained relative names based on the new relative name; and means for sequentially issuing ADD Entry commands based on the changed relative names to connect the identified non-leaf entry and the identified at least one lower entry to the new non-leaf entry.

* * * * *